(12) United States Patent  
Mateo

(10) Patent No.: US 9,404,579 B2  
(45) Date of Patent: Aug. 2, 2016

(54) SEALING DEVICE AND METHOD

(71) Applicant: AIRBUS OPERATIONS SAS, Toulouse (FR)

(72) Inventor: Stéphane Mateo, Dieupentale (FR)

(73) Assignee: AIRBUS OPERATIONS (SAS), Toulouse (FR)

(*) Notice: Subject to any disclaimer, the term of this patent is extended or adjusted under 35 U.S.C. 154(b) by 143 days.

(21) Appl. No.: 13/801,073

(22) Filed: Mar. 13, 2013

(65) Prior Publication Data

US 2013/0241159 A1    Sep. 19, 2013

(30) Foreign Application Priority Data

Mar. 15, 2012  (FR) ...................... 12 52364

(51) Int. Cl.
| | |
|---|---|
| *F16J 15/02* | (2006.01) |
| *F16L 55/11* | (2006.01) |
| *F16L 55/16* | (2006.01) |

(52) U.S. Cl.
CPC ............... *F16J 15/02* (2013.01); *F16L 55/11* (2013.01); *F16L 55/1141* (2013.01); *F16L 55/1612* (2013.01); *Y10T 29/49826* (2015.01)

(58) Field of Classification Search
CPC ....... F16J 15/02; F16L 55/11; F16L 55/1141; Y10T 29/49826

USPC .............. 138/89, 94, 90; 137/540; 277/637
See application file for complete search history.

(56) References Cited

U.S. PATENT DOCUMENTS

| | | | | |
|---|---|---|---|---|
| 3,087,510 | A | * | 4/1963 | Normand, Jr. ............. 137/509 |
| 3,443,713 | A |   | 5/1969 | Kosar |
| 4,270,727 | A |   | 6/1981 | Norman |
| 4,790,348 | A | * | 12/1988 | Gausman et al. ........ 137/516.29 |
| 4,923,221 | A |   | 5/1990 | Taylor |
| 5,195,588 | A |   | 3/1993 | Dave |
| 5,469,890 | A |   | 11/1995 | Carpentier |
| 5,542,475 | A |   | 8/1996 | Turner |
| 5,779,085 | A |   | 7/1998 | Havlinek |
| 5,806,566 | A |   | 9/1998 | Taylor |

FOREIGN PATENT DOCUMENTS

DE           200 10 329          11/2000

\* cited by examiner

*Primary Examiner* — Kevin P Shaver  
*Assistant Examiner* — Robert Nichols, II

(57) ABSTRACT

A sealing device is suitable, for example, for conducting verification and testing of fluid-tightness, and includes a body supporting an end piece equipped with a gasket. The gasket presents an outer surface in which at least one area is in the form of a truncated cone. A sealing method concerns the sealing of an aircraft pipe presenting an opening arranged behind a wall, with the aid of a sealing device as described above.

7 Claims, 3 Drawing Sheets

SEALING DEVICE AND METHOD

CROSS REFERENCE TO RELATED APPLICATION

This application is entitled to and claims the benefit of French Application No. FR 12 52364 filed Mar. 15, 2012, the disclosure of which including the specification, drawings and abstract is incorporated herein by reference in its entirety.

FIELD

The invention relates to a sealing device and method, namely concerning the sealing of an aircraft pipe in order for example to verify and test fluid-tightness. The field of the invention is the field of aviation and more particularly the tools used to perform control testing on an aircraft.

BACKGROUND

A specific tool, referred to herein as a sealing plug, is used in aircraft assembly lines to seal a drainage circuit of an engine pylon in a simple and rapid manner. The seal created using such a tool allows verifying and testing the fluid-tightness of the aircraft fuel system during assembly. The plug generally comprises a body presenting a first end having an end piece fitted with a gasket. During the test, the end piece closes off a pipe and the plug is held in place by an angle bracket acting on the body of the plug while attached to a protective support of the aircraft.

The attached FIG. 1 illustrates a plug of the prior art. In this figure, one will recognize a pipe 2 which constitutes part of a fuel circuit in an engine pylon of an aircraft, as well as a plate 4 forming a wall. This plate 4 has a bore hole 6 which provides access to the pipe 2, the latter extending perpendicularly to and on one side of the plate 4.

On the side of the plate 4 opposite the pipe 2, one will note the presence of an end piece 8 which supports a gasket 10. This end piece 8 is equipped with an angle bracket 12 which enables attachment to a support (not represented) of the corresponding aircraft.

A problem which arises with the implementation of such a prior art plug concerns the attachment of the angle bracket. The area where the end piece and its angle bracket are to be positioned is difficult to access. Placement of the plug may therefore take time.

When in certain cases, as illustrated in FIG. 1, access to the pipe to be sealed occurs through a bore hole in a wall of the aircraft, sometimes the pipe to be sealed is not perfectly centered relative to said bore hole. An offset (illustrated in FIG. 1) therefore appears between the center (or axis) of this bore hole and the center (or axis) of the pipe, which makes it difficult for the end piece and its gasket to establish the seal. One solution consists of sealing only the bore hole made in the wall of the aircraft. However, because of the surface condition of this bore hole, it is not possible to guarantee a good fluid-tight seal. It is therefore advisable to establish a seal at the pipe.

The problem which then arises with a plug of the prior art as described above is that it needs to be adjusted for the offset between the axis of the bore hole and that of the pipe. This is a delicate operation and may require, in addition to the plug, using industrial silicone for example to complete the seal. In addition, access is difficult and complicates the operation, similarly to the conditions for placement of the angle bracket.

Lastly, it is often proposed to have different engines originating from different engine manufacturers in the same type of aircraft. The diameters of the openings to be sealed may then vary and it is necessary to have a sealing tool for each of the engine devices proposed.

SUMMARY

The aim of the invention is to propose a sealing device and a sealing method which allow sealing an aircraft pipe, particularly in an engine pylon of an aircraft, without having to use additional sealing means, such as industrial silicone for example, in certain cases.

Another aim of the invention is for the placement of the sealing device to be rapid and ergonomic. Advantageously, the invention allows the same sealing device to be used to a certain extent for different engines in the same aircraft, or even for different types of aircraft.

For this purpose, the invention proposes a device for sealing a pipe of an aircraft, comprising a body supporting an end piece equipped with a gasket.

In the invention, the gasket comprises an outer surface having at least one area in the shape of a truncated cone.

The truncated-cone shape of at least a portion of the surface of the gasket allows adapting to an offset in the alignment between a pipe and a corresponding bore hole while still ensuring a good seal, for example during verification of fluid-tightness, particularly verification of fluid-tightness for an aircraft fuel tank. In addition, depending on the diameters chosen for the truncated cone, it is also possible to use the same sealing device for pipes of different diameters (within a predetermined range of diameters of course).

In a sealing device of the invention, the end piece is advantageously mobile relative to the body so that it can be adjusted to the environment. Furthermore, it is advantageously arranged so that the device additionally comprises elastic means acting on the end piece in a direction that tends to move the end piece away from the body. In this manner, it is possible to exert pressure on the end piece and thus complete the fluid-tightness achieved by the gasket. In addition, the sealing device thus comprises means which allow it, during insertion of the end piece, to have forces exerted on it in the direction opposite the direction of insertion. In this way, a surface provided on the body, for example an outer surface, applies this force against an external stop and thus holds the device in a sealing position that maintains the contact pressure on the end piece.

In a variant embodiment of a sealing device of the invention in which the end piece is mobile relative to the body, the end piece forms, for example, a distal end of a stem, said stem having a cylindrical head at its proximal end, opposite its distal end, and the body may comprise at least one tubular area and a shoulder at one of its ends arranged so that said cylindrical head can slide inside this tubular area until the shoulder is reached. This creates a piston/cylinder system in which the piston is associated with the end piece intended to create the seal and where the body of the device integrates the cylinder in which the piston slides. The travel of the piston is limited by the shoulder. In this variant of a sealing device of the invention, it is advantageously arranged so that the elastic means comprise a spring housed inside the tubular area and which applies force to the cylindrical head in the direction of the shoulder, to guarantee that pressure is exerted on the gasket. The end of the tubular body opposite the shoulder may, for example, be closed off by a stopper.

To facilitate maintaining a sealing device of the invention in a position in which it establishes a seal, the body can be arranged to present an outer surface on which at least one notch is created, each notch then being usable for maintaining the device. The outer surface of the body may also advantageously comprise an area for gripping it.

To enable a good seal, the gasket is made of rubber for example.

In a sealing device of the invention, the truncated-cone shape is, for example, such that its smallest diameter is less than 9 mm and its largest diameter is greater than 13 mm.

The invention also proposes a method for sealing an aircraft pipe presenting an opening arranged against a wall, a bore hole in said wall providing access to the pipe opening.

In the invention, this method comprises the following steps:
- placing at least a portion of a gasket comprising a truncated-cone shaped area into the pipe opening, through the bore hole in the wall, said gasket being located at one end of a sealing device,
- holding the gasket in place in the opening by locking the sealing device against a support that is fixed relative to the pipe.

This involves a method for implementing a sealing device as described above. It can be used in particular for verifying and testing fluid-tightness.

For such a sealing method, one of the variants of the sealing device described above can be used. Thus, in the method of the invention, the sealing device comprises a tubular body, the gasket is assembled onto an end piece that is mobile relative to the tubular body, the tubular body comprises elastic means acting on the end piece in a direction that tends to move the gasket away from the tubular body, forces are applied to the elastic means after the gasket is placed in the opening, and the tubular body presents an outer face with at least one stop that is able to cooperate with the fixed support such that the force exerted on the elastic means is maintained and contributes to retaining the tubular body against the fixed support.

BRIEF DESCRIPTION OF THE DRAWINGS

Features and advantages of the invention will be more readily apparent from the following description, with reference to the attached schematic drawings in which.

DETAILED DESCRIPTION OF EMBODIMENTS

Figure 1:
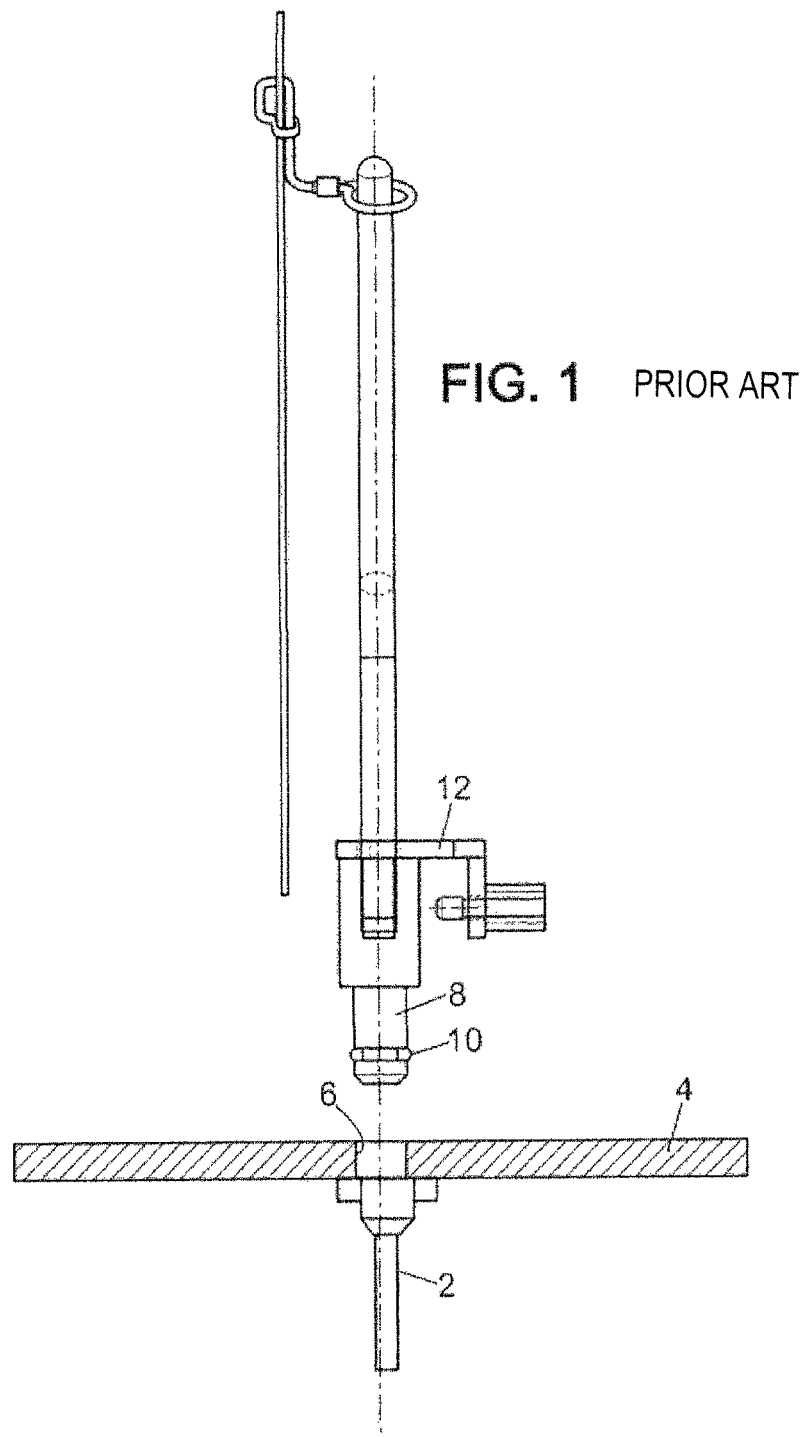
FIG. 1 is a schematic view of a sealing device of the prior art in its environment.
Figure 3:
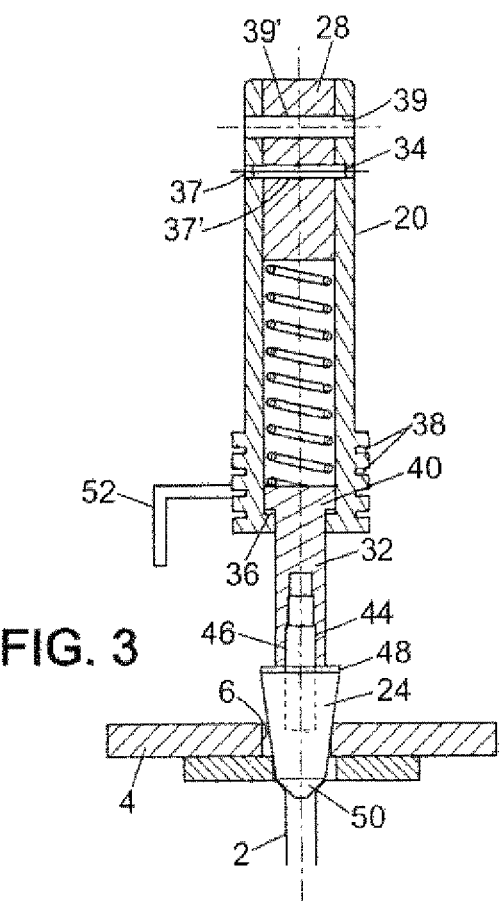
FIG. 3 is a schematic cross-sectional view which is enlarged in comparison to FIG. 2, showing a variant of a sealing device of the invention when it is in service.

FIG. 1 represents a sealing device of the prior art. This device and its environment were already described in the introduction. FIG. 3 shows a sealing device of the invention in an environment similar to what was described with reference to FIG. 1. The references used in FIG. 1 are therefore used again to denote similar elements of the environment in FIG. 3. Thus in FIG. 3 we find a plate 4 containing a bore hole 6. A pipe 2 of an aircraft fuel supply circuit runs on one side of and perpendicular to the plate 4. This pipe 2 is normally located facing the bore hole 6 and centered relative to it. However, within design limits it may still occur that the position of the pipe 2 is offset relative to the bore hole 6.

Figure 2:
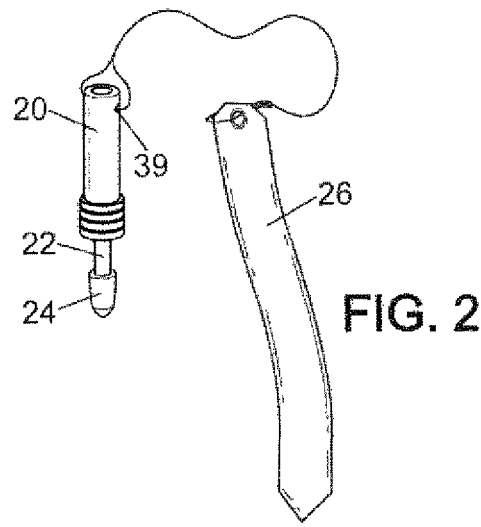
FIG. 2 shows a perspective view of a sealing device according to the invention.

FIG. 2 shows, at a reduced scale in comparison to FIG. 3, a sealing device according to the invention. The structures of the sealing devices of FIGS. 2 and 3 are very similar, and the differences between these structures will be discussed below. Each of these sealing devices comprises a body 20 as well as an end piece 22 equipped with a gasket 24. In FIG. 2, one will also note that the sealing device is equipped with an identification label 26 which is not involved in establishing the seal for the pipe 2.

Figure 4:
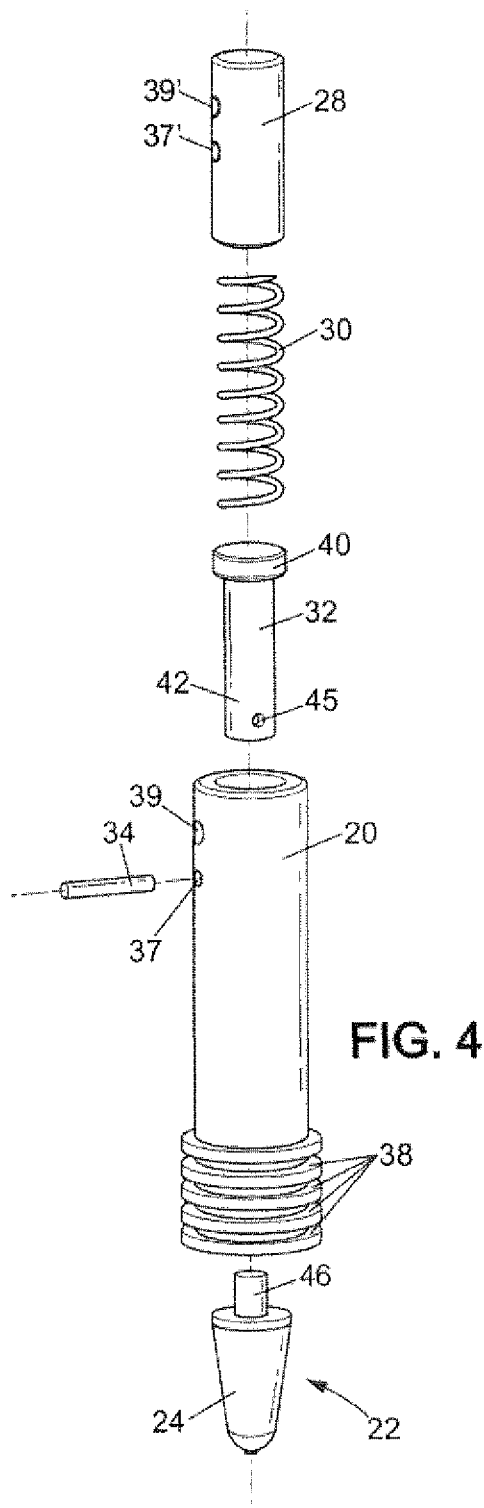
FIG. 4 is an exploded perspective view of the sealing device of the previous figure, further enlarged in comparison to FIG. 3.

FIG. 4 shows the different parts of the sealing device illustrated in FIG. 3.

Visible in FIG. 4 are the body 20, the end piece 22, and its gasket 24. Also represented in FIG. 4 are a stopper 28, a spring 30, a piston 32, and a stop pin 34.

Although conventionally a sealing device is oriented obliquely when it is used to seal a pipe, it is assumed in the following description that, as represented in FIGS. 2 to 4, the sealing device is arranged vertically, with the gasket 24 being located at the bottom.

The body 20 is in the form of a circular cylindrical tube. Therefore the interior of the body 20 defines a housing. This housing is of a constant diameter for substantially the entire length of the body 20. Only the lower portion of the body 20 has a reduced diameter, thus forming a shoulder 36.

The outer surface of the body 20 is also generally circular and cylindrical. It is of a constant diameter for the major portion of its length and thus forms a surface the user can grip. One will note, however, that the lower portion of the body 20 comprises annular ribs spaced regularly apart, forming notches 38.

FIG. 3 also shows the presence of two transverse bore holes in the upper portion of the body 20. As illustrated in this figure, a first bore hole 37 is intended to receive the stop pin 34. As a variant (FIG. 2), this stop pin could be eliminated; the stopper 28 is then glued in the body 20, or forms a single part with it. Aside from the absence of the stop pin and the adaptation of the body 20 and the stopper 28, the sealing device of FIG. 2 has the same elements as those described with reference to FIGS. 3 and 4, in a similar arrangement.

The second transverse bore hole 39 can be used to allow the passage of a tie which connects the identification label 26 to the sealing device.

The stopper 28 has a circular cylindrical shape. Its outer diameter is adapted to the inside diameter of the body 20 (in its upper part). The stopper 28 also has (FIG. 3) transverse bore holes 37' and 39' corresponding to the transverse bore holes of the body 20 with which it is intended to cooperate. Thus, a transverse bore hole 37' of the stopper 28 receives the stop pin 34 as illustrated in FIG. 3 while the other transverse bore hole 39' allows the passage of a tie which attaches the identification label 26.

The piston 32 has a cylindrical head 40 and a stem 42. The cylindrical head 40 has an outside diameter corresponding to the inside diameter of the body 20 such that the piston 32, and in particular its cylindrical head 40, can slide inside the body 20, within the large inside diameter portion of the body.

The stem 42 of the piston 32 has an outside diameter which allows it to slide inside the reduced inside diameter portion of the body 20. The downward travel of the piston 32 is limited by the shoulder 36.

As one can see in FIG. 3, the lower portion of the stem 42 of the piston 32 has a longitudinal bore hole 44 allowing it to receive the end piece 22. An internal threading 45 created in the stem 42, visible in FIG. 4, can accept a headless set screw (not represented) to maintain the end piece 22 in the longitudinal bore hole 44. This attachment facilitates the assembly/disassembly of the end piece 22, which can thus easily be changed. The end piece 22 is in fact the only part of the sealing device which can wear out. In addition, it may be advantageous to be able to fit end pieces of different sizes and/or shapes onto a same sealing device in order to be able to adapt to a larger number of environments.

The end piece 22 is formed of a shaft 46 and the gasket 24. The shaft 46 is a circular cylindrical shaft having substantially at its center a radially extending flange 48. In the chosen orientation, the portion of the shaft 46 which extends above the flange 48 is intended to cooperate with the stem 42 and the piston 32. This upper portion of the shaft 46 fits into the longitudinal bore hole 44 of said stem 42. The lower portion of the shaft 46 is over molded with rubber to form the gasket 24.

The gasket 24 is in the form of a truncated cone starting from the flange 48. The large diameter of the corresponding cone coincides with the diameter of the flange 48. The diameter of the cone shrinks as one moves further away from the flange 48. As a purely illustrative and in no way limiting example, one can for example have a gasket 24 having a truncated-cone portion in which the base by the flange 48 has a diameter of 15 mm while the diameter of the tip of the truncated cone is 9 mm. The height of the truncated cone is, for example, between 15 and 20 mm.

The distal end of the gasket 24, meaning the end opposite the flange 48, is for example in the form of a domed cap 50. This cap may be spherical or may be a truncated cone, the body of the cap 50 then presenting an angle at the tip that is greater than the angle at the tip of the truncated cone of the gasket 24 described above.

The spring 30 is a coil spring which is placed inside the body 20 between the stopper 28 and the cylindrical head 40 of the piston 32. This coil spring has an outside diameter that is compatible with the inside diameter of the housing inside the body 20 in which it is placed. This is, for example, a compression spring. It acts in opposition to an upward motion of the cylindrical head 40 of the piston 32. In other words, the spring 30 pushes the piston 32 towards the outside of the body 20.

FIG. 3 shows all the parts of FIG. 4 in the assembled position, sealing the pipe 2. In the assembled position, the stopper 28 closes off the upper end of the body to close off the housing within the body 20. The cylindrical head 40 closes off the lower end of the housing within the body 20. The spring 30 presses against the stopper 28 and pushes the cylindrical head 40 toward the shoulder 36.

In the assembled position of FIG. 3, the gasket 24 closes off the end of the pipe 2 located next to the bore hole 6 in the plate 4. The spring 30 applies sufficient pressure against the end piece 22, and therefore against the gasket 24, to guarantee a good fluid-tight seal. This pressure is for example between 0.3 and 0.4 bar (numeric data provided for illustrative purposes only).

A notch 38 is used to hold the sealing device in its sealing position on the pipe 2. This notch 38 is intended to cooperate in FIG. 3 with an angle bracket 52 attached to a support that is an integral part of the structure of an engine pylon (not represented) of an aircraft. However, in a variant embodiment, a notch 38 could cooperate with another structural element in order to retain the sealing device.

The presence of several notches 38 allows the same sealing device to adapt to different structural environments and/or to adjust the pressure exerted by the spring 30 on the end piece 22.

The sealing device described above is easy to use. It is sufficient to position the end piece so it presses against the hole to be sealed while holding the sealing device by its body, then push on it to compress the spring and lock it in position by causing the angle bracket to enter one of the notches created on the outer surface of the body of the sealing device. The body, and therefore the sealing device, is then held in place by the compression of the spring 30. The sealing device can thus be put in place with one hand, which facilitates assembly even in limited spaces.

Disassembly of the sealing device is also easy. By pressing on the body of the sealing device and moving it away from the angle bracket, the sealing device is released and can simply be removed.

The conical shape of the gasket offers two advantages. It ensures a good seal even in the case where the bore hole that is supposed to be aligned with the pipe is misaligned, and it allows adapting to different pipe diameters.

One will also note that the sealing device proposed by the invention is simple in structure and can therefore be made inexpensively.

The invention is not limited to the preferred embodiments described above as non-limiting examples. It also relates to the variant embodiments that are within reach of a person skilled in the art, within the context of the following claims.

The invention claimed is:

1. A sealing device for sealing a pipe of an aircraft, the sealing device comprising:
    a body having a plurality of non-interconnected notches on an outer surface thereof;
    an end piece supported by said body and equipped with a gasket comprising an outer surface in which at least one area is in the shape of a truncated cone, the end piece being mobile relative to the body;
    a member acting selectively one at a time on individual ones of said plurality of non-interconnected notches and having structure to enable the member to be attached to a protective support of the aircraft to secure said body in place relative to the pipe of the aircraft; and
    an elastic element acting on the end piece in a direction that tends to move the end piece away from the body.

2. The sealing device according to claim 1, wherein the end piece forms a distal end of a stem, wherein said stem has a cylindrical head at its proximal end, opposite its distal end, and wherein the body comprises at least one tubular area and a shoulder at one of its ends arranged so that said cylindrical head can slide inside this tubular area until the shoulder is reached.

3. The sealing device according to claim 2, wherein the elastic element comprises a spring housed inside the tubular area and which applies force to the cylindrical head in the direction of the shoulder.

4. The sealing device according to claims 2, wherein the end of the body opposite the shoulder is closed off by a stopper.

5. The sealing according to claim 1, wherein the body presents an outer surface comprising a gripping area.

6. The sealing according to claim 1, wherein the gasket is made of rubber.

7. The sealing according to claim 1, wherein the truncated-cone shape is such that its smallest diameter is less than 9 mm and its largest diameter is greater than 13 mm.

* * * * *